United States Patent
Hu et al.

(10) Patent No.: US 6,554,977 B2
(45) Date of Patent: Apr. 29, 2003

(54) ELECTROLYTIC WASTEWATER TREATMENT APPARATUS

(76) Inventors: Clyde Kuen-Hua Hu, 24 Lane, Hsin Yi Road, Section 3, Taipei (TW), 10632; Paul Pei-Yung Hu, 3$^{rd}$ Floor Block C Seaview Mansion, 34 Kennedy Road, Hong Kong (HK); Patrick Pei-Chih Hu, 627 Epworth Pl., Durham, NC (US) 27707

(*) Notice: Subject to any disclaimer, the term of this patent is extended or adjusted under 35 U.S.C. 154(b) by 16 days.

(21) Appl. No.: 09/855,366

(22) Filed: May 15, 2001

(65) Prior Publication Data

US 2001/0040102 A1 Nov. 15, 2001

Related U.S. Application Data

(62) Division of application No. 09/298,284, filed on Apr. 23, 1999, now Pat. No. 6,274,028.

(51) Int. Cl.$^7$ ................................................. C02F 1/461
(52) U.S. Cl. ...................... 204/253; 204/257; 204/263; 204/264
(58) Field of Search ................................. 204/253, 257, 204/263, 264

(56) References Cited

U.S. PATENT DOCUMENTS

| | | | |
|---|---|---|---|
| 3,974,049 A | | 8/1976 | James et al. |
| 4,014,766 A | * | 3/1977 | Watanabe et al. ........... 204/152 |
| 4,161,435 A | | 7/1979 | Moeglich |
| 4,360,417 A | | 11/1982 | Reger et al. |
| 4,415,411 A | | 11/1983 | Kanai et al. |
| 4,445,990 A | | 5/1984 | Kim et al. |
| 4,692,229 A | | 9/1987 | Bjareklint et al. |
| 4,828,667 A | | 5/1989 | Silvestri et al. |
| 5,399,247 A | | 3/1995 | Carey et al. |
| 5,516,972 A | | 5/1996 | Farmer et al. |
| 5,531,865 A | * | 7/1996 | Cole .......................... 205/751 |
| 5,558,755 A | * | 9/1996 | Gardner-Clayson et al. ......................... 205/753 |
| 5,688,387 A | | 11/1997 | Fongen |
| 5,868,941 A | | 2/1999 | Gillham et al. |

* cited by examiner

Primary Examiner—Arun S. Phasge
(74) Attorney, Agent, or Firm—Yongzhi Yang; Marianne Fuierer; Steven J. Hultquist

(57) ABSTRACT

A method and apparatus for purifying aqueous effluent streams to reduce chemical oxygen demand thereof, where the method comprises direct oxidation of water-soluble organic material in an electrochemical cell that incorporates stainless steel electrodes, whose stability and lifetime are enhanced by inclusion of circulating metal chips.

9 Claims, 2 Drawing Sheets

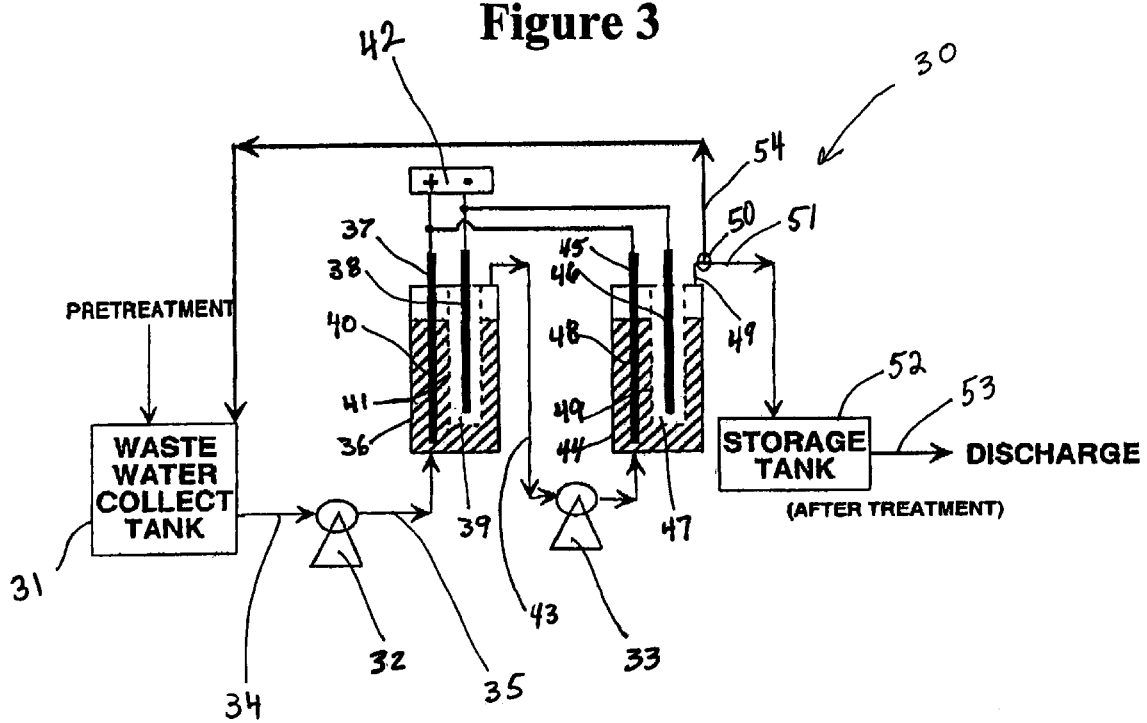

ELECTROLYTIC WASTEWATER TREATMENT APPARATUS

CROSS REFERENCE TO RELATED APPLICATION

This is a divisional application of pending U.S. patent application No. 09/298,284, filed Apr. 23, 1999 now U.S. Pat. No. 6,274,028 in the names of Patrick Pei-Chih Hu, Pual Pei-Yung Hu, and Clyde Kuen-Hua Hu.

BACKGROUND OF THE INVENTION

1. Field of the Invention

The invention relates generally to a method and apparatus for purifying aqueous effluent streams to reduce contamination as measured by chemical oxygen demand, where the method comprises direct oxidation of water-soluble organic and oxidizable inorganic substances in an electrolytic oxidation cell that incorporates stainless steel electrodes, and wherein the stability and lifetime of the anode are enhanced by incorporation of metal chips.

2. Description of the Related Art

Industrial wastewater streams may be contaminated by various substances that render their discharge into waterways or municipal waste treatment systems problematic or illegal. Contaminants may be organic or inorganic in nature and are often found in complex combinations.

One widely regulated parameter is "chemical oxygen demand" (COD), a measure of the quality of wastewater effluent streams prior to discharge. The COD test predicts the oxygen requirement for complete oxidation of oxidizable contaminants present in the effluent; it is used for the monitoring and control of discharges, and for assessing treatment plant performance. Chemical oxygen demand is defined as the amount of oxygen in milligrams per liter (parts-per-million, ppm) required-to oxidize both organic and oxidizable inorganic compounds that are present in the effluent.

The United States Environmental Protection Agency (USEPA) provides a set of standard methods to determine COD in aqueous effluents:

| | Test Method | USEPA Document Source |
|---|---|---|
| Chemical Oxygen Demand - Colorimetric | 0410.4 | 600/4-79-020 |
| Chemical Oxygen Demand - Semi-Automated Colorimetric | 0410.4 | 600/R-93-100 |
| Chemical Oxygen Demand - Titrimetric, High Level | 0410.3 | 600/4-79-020 |
| Chemical Oxygen Demand - Titrimetric, Low Level | 0410.2 | 600/4-79-020 |
| Chemical Oxygen Demand - Titrimetric, Mid Level | 0410.1 | 600/4-79-020 |

Acceptable wastewater treatment methods must be cost-effective, and hence a desirable method will be characterized by rapidity of contaminant removal, stability of the process over time, low cost of energy and consumables, and simplicity of equipment design. In this view, electrolytic oxidation is a favorable method for reducing the amount of organic compounds and other oxidizable species in an aqueous effluent to a level that is acceptable for discharge to a treatment facility. Electrolytic oxidation has several advantages over chemical or thermal treatment techniques, including ease of operation, simplicity of design, and relatively small equipment space requirements. Electrolysis is also considered to be relatively safe to operate when compared to oxidative treatment techniques which require handling of powerful chemical oxidants.

The electrolytic treatment of wastewater has been the subject of much research and many patents, e.g., U.S. Pat. No. 4,445,990, "Electrolytic Reactor for Cleaning Wastewater," issued May 1, 1984; U.S. Pat. No. 5,516,972, "Mediated Electrochemical Oxidation of Organic Wastes Without Electrode Separators," issued May 14, 1996; U.S. Pat. No. 5,688,387, "Turbo Electrochemical System," issued Nov. 18, 1997.

However there remain a number of problems associated with known methods of lectrolytic oxidation of solutes in wastewaters. An important focus of difficulty is the lack of table, inexpensive anode materials.

In wastewater purification, a high oxygen overvoltage is required at the anode for water-oxidation intermediates to be formed from degradation of oxidation-resistant organic substances. Most anode materials gradually corrode during use in electrolytic oxidation, especially in harsh chemicals. Corrosion of typical anodes such as platinum, ruthenium oxide, lead dioxide and tin dioxide results in a lack of process stability, is uneconomical, and leads to discharge of unacceptable toxic species into the environment. Platinum anodes are the most acceptable of traditional electrodes, yet in practice the rate of platinum loss from the electrode is high enough that a metal recovery system would be required, adding significantly to the cost and complexity of such an electrolytic oxidation apparatus and method. Lead dioxide and graphite electrodes are not sufficiently stable: modification by tin oxide doping has been proposed to increase electrode lifespan, but leads to the aforementioned problem of release of a toxic species.

Furthermore, many anode materials tend to become fouled during electrolytic oxidation of various solutes by the formation of an adsorbed layer of residue on the working surface of the anode. This lowers the effectiveness and useful lifetime of the anode, resulting in longer treatment times and more frequent equipment-related shutdowns. An anode that is not subject to a decrease in efficiency due to change in polarization at the electrode surface is needed in the art.

An additional problem with conventional anode materials is lack of energy efficiency when used in electrolytic oxidations. As a result of such deficiencies, the wastewater treatment system requires a relatively long time and high energy expenditure to achieve desired results, at the electrical current densities that are typically employed.

The development of suitable electrode materials for wastewater treatment has long been an active area of research. Some representative approaches are described in the following patents. U.S. Pat. No. 4,360,417, "Dimensionally Stable High Surface Area Anode Comprising Graphitic Carbon Fibers," issued Nov. 23, 1982, describes anodes comprising carbonaceous fibrous materials with a surface coating of a mixture of titanium dioxide and ruthenium dioxide. U.S. Pat. No. 4,415,411, "Anode Coated with β-Lead Dioxide and Method of Producing Same," issued Nov. 15, 1983, describes an anode which comprises various layers of titanium, a platinum-group metal, and a lead dioxide coating. U.S. Pat. No. 5,399,247, "Method of Electrolysis Employing a Doped Diamond Anode to Oxidize Solutes in Wastewater," issued Mar. 21, 1995, describes an anode comprising electrically conductive crystalline doped diamond. Such electrodes do not overcome the problems of high cost, contribution of toxic species to the waste stream, and lack of process stability due to corrosion or formation of adsorbed layers on the electrode surface.

Electrodes that comprise particulate materials are known. Electrodes comprising electroconductive particulates have been described for cathodic processes such as electroprecipitation or electrowinning, that is, the recovery of a metal by deposition of the metal from an aqueous solution, such as a metal-ion-contaminated wastewater or aqueous leach liquors obtained by leaching ore. The metal to be recovered is deposited onto the cathode to a desired thickness, and the cathode is then removed and the metal recovered. Particulate cathodes are described, e.g., in U.S. Pat. No. 4,692,229, "Electrode Chamber Unit for an Electro-Chemical Cell Having a Porous Percolation Electrode," issued Sept. 8, 1987; U.S. Pat. No. 3,974,049, "Electrochemical Process, issued Aug. 10, 1976; and references cited therein. Because the process constraints of the cathodic applications for which these electrodes are designed are quite different, such particulate cathode materials, e.g., graphite, copper, do not have the ability to be used as the anode in an electrolytic oxidation and cannot be operated with high energy-efficiency and in the presence of oxygen over-voltages, as would be required for an oxidative wastewater purification process.

An organic or organometallic synthesis process using an anode comprising metal particulates which are consumed in the synthesis reaction has been described in U.S. Pat. No. 4,828,667, "Electrolytic Cells with Continuously Renewable Sacrificial Electrodes," issued May 9, 1989. This patent describes the electrocarboxylation of 2-acetonaphthone with the accompanying consumption of the anode. The electrocarboxylation process disclosed in this reference utilizes small aluminum cylinders which are continuously consumed and replenished by a feed device, and involves the following electrochemical reactions:

cathode:
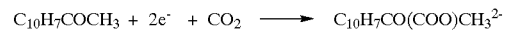
$$C_{10}H_7COCH_3 + 2e^- + CO_2 \longrightarrow C_{10}H_7CO(COO)CH_3^{2-}$$
anode:
$$Al \longrightarrow Al^{3+} + 3e^-$$
anode:
$$Al \longrightarrow Al^{3+} + 3e^-$$

Anodes designed for such processes are not readily adaptable to use in an electrolytic oxidative wastewater purification process. Further, the aluminum anode in such system would contribute toxic aluminum to the waste stream and would quickly become passivated by an oxide coating.

There is thus a compelling need for a method and apparatus for electrolytic oxidation of solutes in liquid solutions, which will avoid or minimize the problems described above. Such a method and apparatus will desirably have the following features: an anode formed of a relatively inexpensive material and of relatively simple design; an anode whose corrosion does not result in discharge of toxic species; an anode that does not become significantly inefficient through fouling caused by the formation of an adsorbed layer; an anode that operates with high energy-efficiency; and an anode whose ongoing corrosion does not destabilize the process variables over time.

SUMMARY OF THE INVENTION

The present invention in one aspect relates to an electrolytic purification method and apparatus for treatment of wastewaters to reduce chemical oxygen demand, by oxidation of water-soluble organic and other oxidizable materials contained therein. The electrolytic purification system of the invention utilizes one or more electrochemical cells. The cells employ stainless steel electrodes and contain iron chips, which are mobile and circulate freely as liquid flows through the cell. The iron chips are in electrical contact with the anode and are prevented from making contact with the cathode by a non-conductive but liquid-permeable barrier. The iron chips thus provide a dynamic and fluid electrode surface that is efficient and resistant to performance degradation.

In the practice of the invention, a voltage, e.g., of 1–20 volts (V), is applied across the electrodes to generate a desired current, e.g., of 2–15 amperes (A). Electrolysis in such a cell reduces COD in typical wastewaters by oxidizing to $CO_2$ water-soluble organic and other oxidizable contaminants.

The invention relates in another aspect to an electrolytic oxidation apparatus, comprising two or more electrochemical cells of the above-described type, arranged in series for sequential flow of wastewater therethrough to effect the desired level of COD removal.

In one specific embodiment, the invention relates to an electrolytic oxidation process for purifying a wastewater stream by oxidation of water-soluble organic and oxidizable inorganic substances contained therein, such process including the steps of:

a flowing the wastewater stream into an electrolytic oxidation cell, wherein the cell comprises stainless steel anode and cathode and contains iron chips, with the chips being in electrical contact with the anode and prevented from making electrical contact with the cathode by a non-electrically-conductive, liquid-permeable barrier;

applying a voltage across the electrodes sufficient to produce a current of from about 2 to about 20 A.

In one embodiment of the inventive process, the wastewater stream is characterized by a conductivity of from about 200 to about 2000 micro Siemens per centimeter ($\mu$S/cm) and COD of from about 200 to about 2000 parts per million by volume (ppm). The electrolytic oxidation cell is preferably filled to between 80% and 95% of its volumetric capacity with the iron chips, and the non-electrically-conductive, liquid-permeable barrier preferably comprises a plastic netting. The wastewater stream may be recirculated through the electrolytic oxidation cell to achieve desired levels of purity.

The inventive process in another aspect may comprise:

flowing the wastewater through one or more additional electrolytic oxidation cells, correspondingly constructed to comprise stainless steel anode and cathode elements and to contain iron chips, in which the chips being in electrical contact with the anode and prevented from making electrical contact with the cathode by a non-electrically-conductive, liquid-permeable barrier;

applying a voltage across the across the electrodes of the additional electrolytic oxidation cells sufficient to produce a current of from about 2 to about 20 A.

The invention in another specific aspect further comprises an electrolytic oxidation apparatus for purifying a wastewater stream by oxidation of water-soluble organic and oxidizable inorganic substances contained therein. Such apparatus comprises:

an electrolytic oxidation cell, where the cell comprises stainless steel anode and cathode and contains iron chips, said chips being in electrical contact with the anode and prevented from making electrical contact with the cathode by a non-electrically-conductive, liquid-permeable barrier;

means, such as a current source, power supply, generator, turbine, power cable or other electrical power elements, for applying a voltage across the stainless steel anode and cathode sufficient to produce electrolytic oxidation conditions for oxidation of organic and oxidizable inorganic substances in the wastewater;

means, e.g., including flow circuitry elements such as piping, conduits, flow channels, connecting fittings, etc., and motive flow devices such as pumps, compressors, impellers, ejectors, eductors, etc., for flowing wastewater into and out of the electrolytic oxidation cell.

Preferably the non-electrically-conductive, liquid-permeable barrier comprises a plastic netting, but other permeable barrier structures may be employed, such as mesh, screen, membrane or other structures of a liquid permeable and non-conductive character, as hereinafter more fully described.

The iron chips are preferably generally disk-shaped, but may be of any suitable shape and size characteristics.

An electrolytic oxidation apparatus according to the invention may further comprise one or more additional electrolytic oxidation cells similar to the first, with means such as pump and conduit elements to flow the wastewater from the first electrolytic oxidation cell to the one or more additional electrolytic oxidation cells for sequential passage through the electrolytic cells in the apparatus system.

Various other aspects, features and illustrative embodiments of the invention will be more fully apparent from the ensuing disclosure and appended claims.

BRIEF DESCRIPTION OF THE DRAWINGS

FIG. 3 is a schematic representation of an electrolytic oxidation wastewater treatment apparatus according to another embodiment of the invention, employing two electrolytic oxidation cells in series.

DETAILED DESCRIPTION OF THE INVENTION, AND PREFERRED EMBODIMENTS THEREOF

Figure 1:
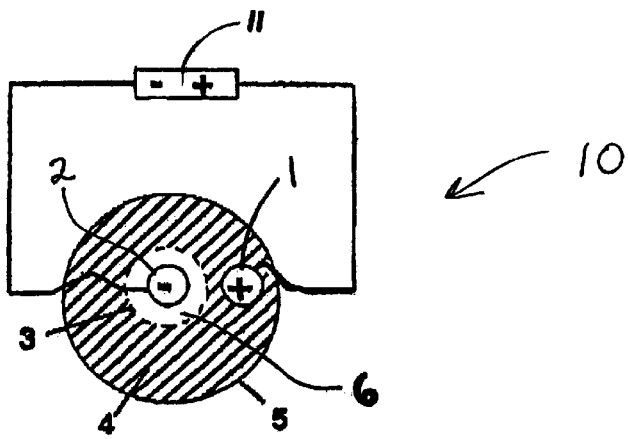
FIG. 1 shows a schematic top view of an electrolytic oxidation cell according to the invention.

The present invention relates to an electrolytic purification apparatus and method for treatment of wastewaters to reduce chemical oxygen demand, by oxidation of water-soluble organic and other oxidizable materials in one or more electrochemical cells. The desired electro-oxidation is conducted in one or more electrolytic oxidation cells that employ stainless steel electrodes and contain metal chips. The metal chips are mobile and circulate freely as liquid flows through the cell, so that the metal chips form many, ever-changing electrical contacts with the anode, but are prevented from making electrical contact with the cathode by a non-electrically-conductive but liquid-permeable barrier.

The metal chips thus provide a dynamic and fluid electrode surface that is efficient and resistant to performance degradation. The wastewater may be recirculated through the electrolytic oxidation cell(s) for additional purification. The apparatus may optionally include monitoring devices such as oxygen, pH, and/or conductivity meters, or means to sample the wastewater stream for parameters such as COD.

The electrolytic oxidation cells can be of any suitable shape and volume, as may be readily determined based on the specific wastewater-generating process and/or wastewater stream characteristics involved in a particular end use application of the invention. The cell is fabricated of any suitable material, as is readily determinable by those of ordinary skill in the art without undue experimentation, preferably a material that is strongly resistant to degradation and rupture under the conditions of use.

In one illustrative embodiment, the cell is a non-conductive tubular container with an inside diameter of from about 1 to about 3 inches and a length of from about 1 and about 3 feet. At the top of the tube, a flange is secured to the tubular container. The flange has three openings. Through two openings pass stainless steel rods which serve as the electrodes, with diameters of about 1 mm each and a distance of about 10 mm therebetween throughout their length. The third opening in the upper flange is an outlet for the treated liquid. At the bottom of the tube is an opening through which untreated solution is flowed into the cell.

The stainless steel electrodes are fabricated with any suitable dimensions proportionate to the size of the electrolytic cell compartment. The electrodes are formed of stainless steel. The stainless steel may be of any suitable type, e.g., 316 stainless steel alloy or any other advantageous stainless steel composition, as will be readily determinable by those of ordinary skill in the art.

The metal chips are formed of iron. The "chips" may be of any shape that is conducive to free circulation and mixing in a flowing liquid stream and is not prone to clumping or adhesion to the electrolytic cell wall or electrode surface. In one embodiment the metal chips are generally disk-shaped. Suitable dimensions for such metal chips may be readily determined without undue experimentation by those of ordinary skill in the art. One highly preferred size of such metal chips is about 3 mm in diameter and about 1 mm in thickness. Other shapes of chips that may be usefully employed in the broad practice of the invention include flakes, rings, pellet shapes, spheres, cylindrical shapes, etc. Preferably, the chips are flattened or planar to enhance electrical contacting in the slurry of chips in the wastewater undergoing treatment. The chips may be of a single dimensional size, or the chips may constitute a population of differing sized members, as may be desired or appropriate in a given end use application of the invention.

The cell compartment is filled with metal chips to a level that allows the chips to mix and circulate freely in a flowing liquid stream, but that is sufficiently concentrated in chips so that they will be in frequent physical and electrical contact with one another and with the anode. Desirably, the chips are able to mix and circulate freely and form many constantly changing current pathways, to provide a dynamic and fluid electrode surface. The cell is functional when filled in the volumetric range of from about 20% up to in the vicinity of 100% with metal chips, based on the volume of the cell chamber. The preferred filling range is from about 80% to about 95% by volume, based on the total volume of the cell chamber.

A non-electrically-conductive but liquid-permeable barrier prevents the metal chips from making electrical contact with the cathode. This barrier must be sufficiently liquid-permeable that the wastewater being treated can flow freely through the cell and between the anode and cathode vicinities. The barrier will preferably have openings or pores which may be regular or irregular in shape, and will have mean diameters of a size that will allow maximal liquid flow while preventing the through-passage of a deleterious, i.e. short-circuit-causing, amount of the metal chips during the operation of the electrolytic cell. The preferred dimensions of the openings or pores will be determined based on the size of the metal chips being used.

The non-conductive but liquid-permeable barrier most preferably is formed of a material which is resilient to the constant impacts of the metal chips when the cell is in operation, which is chemically inert under the conditions of electrolytic oxidation, and which is not electrically conductive. Examples of suitable barrier materials include plastic netting, polymeric films (e.g., of polyvinylidene chloride, polysulfone, polyvinylchloride, etc.), ceramic screens, sintered glass fiber sheeting, etc.

The wastewater to be purified in the practice of the invention may require pretreatment to remove suspended solids, to adjust pH, and/or to adjust conductivity, prior to its introduction into the electrolytic oxidation cell. Accordingly, the process system may comprise an upstream clarifier or sedimentation basin, screening unit, filter, chemical dosing chamber, biological oxygen demand (BOD) removal treatment unit, radiation treatment chamber, ozonation unit, or any other pretreatment unit that will advantageously assist the processing of the wastewater in a manner that will, in combination with the COD treatment system of the invention, produce a final effluent of the desired discharge quality.

For example, the upstream optional pretreatment of the wastewater may include processing to lower the levels of suspended solids in the wastewater, including sedimentation and/or filtration, with or without flocculation of the wastewater.

When not in use, the electrolytic oxidation cell is stored charged with a solution with a conductivity of from about 500 to 2000 $\mu$S/cm. The solution can be a simple salt solution, e.g. NaCl.

Prior to electrolytic oxidation treatment, the conductivity of the wastewater is adjusted to a suitable level, e.g., in a range of from about 200 to about 2000 $\mu$S/cm. A preferred conductivity for treatable wastewaters is in the vicinity of about 1500 $\mu$S/cm. The conductivity can be adjusted with any strong electrolyte, e.g., alkali and alkaline earth chlorides, bromides, iodides, nitrates, perchlorates, chlorates, bromates, and alkali metal sulfates. For reasons of cost and simplicity, NaCl is typically used to adjust conductivity to a level sufficient to support electrolysis.

Also, prior to electrolytic oxidation treatment, the pH of the wastewaters is suitably adjusted to a pH level of from about 7 to about 10, preferably from about 8 to about 10. Any strong inorganic base can be used, but for reasons of cost and simplicity, NaOH or $Na_2CO_3$ are typically employed.

In electrolytic oxidation of wastewater to reduce COD, fairly complex organic molecules are frequently oxidized all the way to $CO_2$. In such electrodestruction reactions, many bonds are broken and large molecular rearrangements occur. Such reactions are often much slower than simple single-electron-transfer reactions. The flow rate, temperature, current density and electrode potential will all affect the rate at which complete electrolytic oxidation of the oxidizable contents of a wastewater stream can occur.

In one illustrative embodiment of the invention using an electrolytic cell having dimensions described hereinabove, a voltage of 1–20 V is applied across the electrodes to generate a current of 2–15 A. Preferably, the applied voltage is about 10 V yielding a current of about 10 A. The wastewater stream is pumped into the cell at a volumetric flow rate of from about 0.5 to about 5.0 liters per minute (L/min), preferably from about 0.7 to about 3.0 L/min. The wastewater may be recirculated through the cell for a given number of times, or there may be a system to continually feed and draw off wastewater, calculated to allow a suitable average residence time in the cell to yield the desired reduction in COD.

The wastewater treatment system of the invention may utilize any suitable flow circuitry means, including pumps, fans, impellers, etc., arranged in the flow circuit including piping, conduits, fittings, sensors, monitors, controllers, etc., as necessary or desirable in a given end use application of the invention to achieve a desired level of COD reduction in a specific wastewater being treated. The wastewater may derive from any suitable source, such as for example an industrial manufacturing or processing facility, mining operation, riparian streams, power generation plants, etc.

The process of the invention may be carried out at any suitable temperature level, and preferably is at or near ambient temperature, e.g., temperature in the range of from about 5 to about 40° C.

The residence time of the wastewater in the electrolytic cell may be widely varied, depending on the type of wastewater involved and its COD content (amount of COD, and types of COD-constituting components), as well as the equipment constraints of the system, the degree of COD removal required, the dimensional characteristics of the electrolytic cell(s) in the system, the volumetric flow rate of the wastewater into the treatment system, and the current density and other process conditions utilized in the treatment system.

The specific conformation of equipment and the operating conditions to be employed may be readily empirically determined, by varying the process system variables of interest and determining the resulting COD removal efficiency, to select the structural form and the processing parameters of the electrolytic treatment system in a specific embodiment.

The electrolytic treatment method of the invention may be carried out in a continuous, semi-continuous, or batch mode, depending on the specifics of the wastewater being treated. It may be desirable to utilize the system of the invention in combination with holding tanks, surge reservoirs or other storage facilities when the wastewater flow is intermittent or highly variable in character.

The electrolytic oxidation treatment method of the invention may further comprise passing the wastewater through additional electrolytic oxidation cells in a series arrangement, to obtain more rapid treatment or higher final purities. The cells in series may be operated from one or more current sources and may have one or more pumping means, as appropriate for the size and flowrates involved.

The apparatus and method of the invention are useful for treating wastewaters with COD in the range of about 200 ppm to about 2000 ppm. After treatment according to the invention, the wastewaters typically show COD readings that are reduced by more than 50%, preferably by more than 80%, and even more preferably by more than 90%.

In the course of electrolytic oxidation, metal ions released from the electrodes can be chelated by organic substances present in the wastewaters, resulting in flocculation. The purification system can include a means for separating the flocculate from the liquid phase.

The floc separation may be effected in a sedimentation tank or gravity clarifier, centrifuge, filter or other suitable separation means, optionally with addition of a coagulant or agglomerating agent to the floc-containing wastewater, to effect consolidation and enhanced separation of the floc particles from the wastewater.

Referring now to the drawings, FIG. 1 is a schematic top view of an electrolysis cell 10 according to one embodiment of the invention. The cell includes a chamber containing anode 1 and cathode 2 immersed in electrolyte 6. The cell is filled to about 80%–95% by volume of its capacity with metal chips 4, which are prevented from contacting cathode 2 by a porous barrier 3 which is itself not electrically conductive. The anode and cathode are supplied with current from current source 11 at a predetermined voltage.

Figure 2:
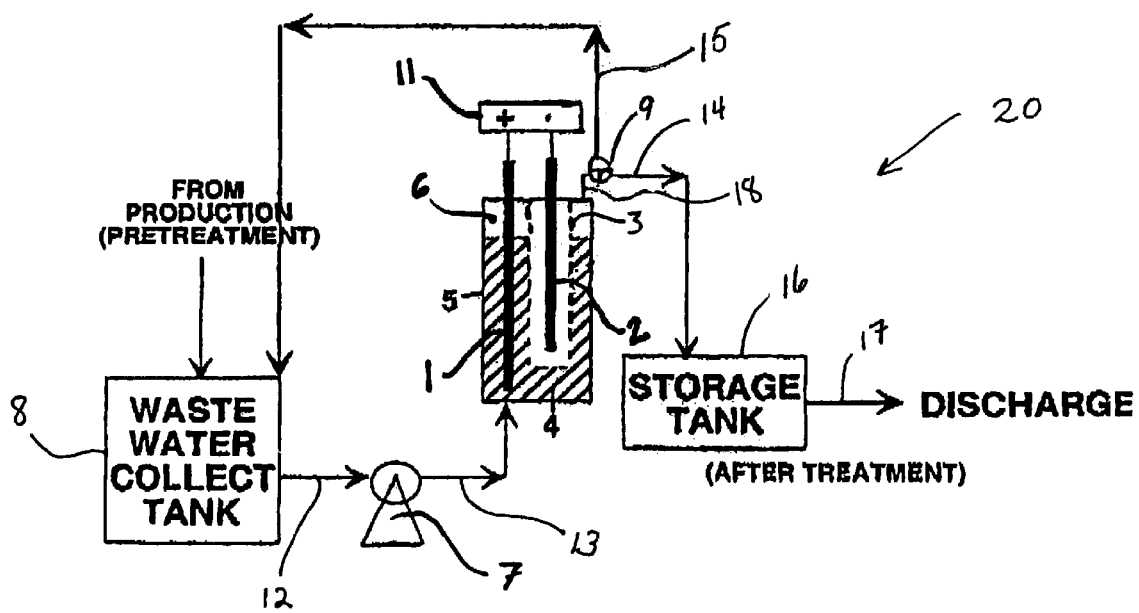
FIG. 2 is a schematic representation of an electrolytic oxidation wastewater treatment apparatus according to one embodiment of the invention.

FIG. 2 is a schematic side view of a purification apparatus employing the electrolysis cell of FIG. 1. As in FIG. 1, the cell comprises a chamber containing anode 1 and cathode 2 immersed in electrolyte 6. The cell is filled to about 80%–95% of its capacity with metal chips 4, which are prevented from contacting cathode 2 by a porous barrier 3 which is itself not electrically conductive. The anode and cathode are supplied with current from current source 11 at a predetermined voltage. Wastewater is pumped by pump 7 from wastewater collection tank 8 via conduits 12 and 13 to the electrolytic oxidation cell compartment 5.

As the wastewater flows through the cell compartment, the metal chips 4 are constantly agitated and present a dynamic surface to the liquid phase. For purposes of maintaining such agitation, the cell chamber may contain an impeller or a gas sparger to enhance the degree of circulation of the water/chips slurry in the cell chamber. Alternatively, the circulation rate of liquid through the cell may be inherently sufficient to maintain the desired degree of agitation or circulation of the chips in the water/chips slurry.

When current is supplied to the anode 1 and cathode 2 from current source 11, oxidation reactions occur at the stainless steel anode 1 and at the surfaces of the metal chips 4, which are in electrical contact with the anode. Organic and oxidizable inorganic substances in the wastewater are oxidized, and the treated wastewater flows to three-way valve 9, from which depending on the valve position, it may flow via conduit 14 to a storage tank 16. and then via conduit 17 to discharge to a waterway or a treatment facility (not shown). Alternatively, the treated wastewater may be returned via conduit 15, collection tank 8, and conduits 12 and 13 to thereby undergo additional oxidation cycles.

FIG. 3 is a schematic representation of an electrolytic oxidation wastewater treatment apparatus 30 according to another embodiment of the invention, employing two electrolytic oxidation cells in series. Wastewater from collection tank 31 is pumped by pumps 32 and 33 through the apparatus. Wastewater flows through conduits 34 and 35 to first electrolytic oxidation cell compartment 36, where anode 37. and cathode 38 are immersed in electrolyte 39. Anode 37 is in electrical contact with metal chips 40, which fill the cell compartment 36 to about 80% to 95% of its volumetric capacity, and which are prevented from contacting cathode 38 by a liquid-permeable barrier 41 which is not itself electrically conductive. Current source 42 provides current to the anode 37 and cathode 38, whereby organic and oxidizable inorganic substances in the wastewater are oxidized.

Upon exiting the first cell, the wastewater flows via conduit 43 to second electrolytic oxidation cell compartment 44, where the process is repeated. Second anode 45 and second cathode 46 are immersed in second electrolyte 47, which may be the same as first electrolyte 39 or may be different. Anode 45 is in electrical contact with metal chips 48, which fill the cell compartment 44 to about 80% to 95% of its volumetric capacity, and which are prevented from contacting cathode 45 by a liquid-permeable barrier 49 which is not itself electrically conductive. Current source 42 provides current to the anode 45 and cathode 46, whereby organic and oxidizable inorganic substances in the wastewater are oxidized. Alternatively, anode 45 and cathode 46 may be connected to a second current source.

The wastewater then flows via conduit 59 to three way valve 50, from which, depending on the valve position, the wastewater may flow via conduit 51 to a storage tank 52 and then via conduit 53 to discharge to a waterway or a treatment facility (not shown), or alternatively, the treated wastewater is returned via conduit 54, collection tank 31, and conduits 34 and 35 for additional oxidation cycles.

Electrolysis in such a cell reduces COD in typical wastewater by oxidizing to $CO_2$ the water-soluble organic and other oxidizable contaminants of the wastewater. Typical purification levels are in the range of 80–90% reduction in COD for one pass through the electrolytic oxidation cell, and can exceed 95% COD removal for recirculation systems, or in multi-cell wastewater treatment systems of the invention.

The features and advantages of the invention are more fully shown with reference to the following non-limiting examples.

EXAMPLE 1

Treatment of Wastewater from a Power Generation Station

Wastewater from a power generation station with a COD reading of 100 ppm was treated in an electrolytic oxidation apparatus of a type as depicted in FIG. 2. The initial pH of the wastewater was 9.8 and its initial conductance was 1280 $\mu$S/cm. The wastewater was pumped through the cell at a rate of 1.2–2.6 liters/minute. The voltage was held at 6.0 V and current was 12.5 A. After 5 minutes, the outlet stream was tested for COD with a result of 20–40 ppm, corresponding to a COD reduction of 60% to 80% in the effluent discharge stream, relative to the influent stream COD level.

EXAMPLE 2

Treatment of Wastewater from Printed Circuit Board Manufacture

Wastewater from printed circuit board manufacture with a COD reading of 200 ppm was treated in an electrolytic oxidation apparatus of a type as depicted in FIG. 3, employing two cells in a series arrangement. The initial pH of the wastewater was 9.8 and its initial conductance was 1300 $\mu$S/cm. The solution was pumped through the cell at a rate of about 1 liter/minute. In the first cell, the voltage was held at 6–8 V and current was 9–12 A. In the second cell, the voltage was 10–12 V and the current was 9–12 A. After passing through the two cells, the outlet stream was tested for COD with a result of 20–50 ppm, corresponding to a COD reduction level of 75% to 90% in the effluent discharge stream, relative to the influent stream COD level.

EXAMPLE 3

Treatment of Wastewater from Landfill Seepage

Wastewater which had seeped from a garbage dump landfill site with a COD reading of 250 ppm was treated in an electrolytic oxidation apparatus of the type as depicted in FIG. 2. The initial pH of the wastewater was 9.0 and its initial conductance was 1580 $\mu$S/cm. The solution was pumped through the cell at a rate of 1.2–4.0 liters/minute.

The voltage was held at 9–9.5 V and current was 4.0–5.0 A. After 5 minutes, the outlet stream was tested for COD with a result of 20–50 ppm, which corresponds to a COD reduction of 80% to 92%.

While the invention has been described herein with reference to various illustrative features, aspects and embodiments, it will be appreciated that the invention is susceptible of variations, modifications and other embodiments, other than those specifically shown and described. The invention is therefore to be broadly interpreted and construed as including all such alternative variations, modifications and other embodiments within its spirit and scope as hereinafter claimed.

What is claimed is:

1. An electrolytic oxidation apparatus for purifying wastewater by oxidation of water-soluble organic and oxidizable inorganic substances contained therein, said apparatus comprising:

an electrolytic oxidation cell, where the cell comprises a stainless steel anode and cathode and contains iron chips, said chips being in electrical contact with the anode and prevented from making electrical contact with the cathode by a non-electrically-conductive, liquid-permeable barrier;

pre-oxidation means for adjusting conductivity of the wastewater to a range of from about 200 $\mu$S/cm to about 2000 $\mu$S/cm;

means for applying a voltage in a range of from about 1 V to about 20 V across the stainless steel anode and cathode to produce a current in a range of from about 2 to 20 amperes in the electrolytic oxidation cell to effect electrolytic oxidation conditions therein when the cell contains wastewater; and means for flowing wastewater into and out of the electrolytic oxidation cell.

2. The electrolytic oxidation apparatus of claim 1, wherein the non-electrically-conductive, liquid-permeable barrier comprises a plastic netting.

3. The electrolytic oxidation apparatus of claim 1, further comprising means for recirculating wastewater through the electrolytic cell.

4. The electrolytic oxidation apparatus of claim 1, wherein the electrolytic cell comprises a tubular housing of elongate character.

5. The electrolytic oxidation apparatus of claim 1, further comprising a pretreatment chamber upstream of the electrolytic cell.

6. The electrolytic oxidation apparatus of claim 5, wherein said pretreatment chamber comprises a solids-removal chamber.

7. The electrolytic oxidation apparatus of claim 1, further comprising a post-treatment chamber downstream of the electrolytic cell.

8. The electrolytic oxidation apparatus of claim 1, further comprising at least one additional electrolytic cell, wherein the electrolytic cells are arranged in a series arrangement, for sequential flow of wastewater therethrough to produce a final wastewater effluent of reduced COD content.

9. The electrolytic oxidation apparatus of claim 1, wherein the pre-oxidation means adjusts the conductivity of the wastewater to about 1500 $\mu$S/cm, and wherein the current in the electrolytic oxidation cell is in a range of from about 9 to 12 amperes.

\* \* \* \* \*